United States Patent [19]
Sanderson

[11] Patent Number: 5,806,673
[45] Date of Patent: Sep. 15, 1998

[54] MUSICAL SOUND EQUIPMENT CASE

[75] Inventor: David B. Sanderson, Villa Park, Calif.

[73] Assignee: SKB Corporation, Orange, Calif.

[21] Appl. No.: 850,483

[22] Filed: May 2, 1997

[51] Int. Cl.⁶ ................................................. A45C 13/00
[52] U.S. Cl. ......................... 206/314; 190/115; 190/122
[58] Field of Search .................................. 206/314, 576; 190/21, 23, 25, 28, 37, 112, 115, 118, 122, 124, 126, 127, 19; 361/625

[56] References Cited

U.S. PATENT DOCUMENTS

| | | | |
|---|---|---|---|
| D. 213,175 | 1/1969 | Bath | D9/224 |
| D. 219,085 | 10/1970 | Moore | D87/1 |
| D. 220,292 | 3/1971 | Sottsass, Jr. | D64/11 |
| D. 225,383 | 12/1972 | Eisele | D87/1 |
| D. 286,466 | 11/1986 | King et al. | D3/77 |
| D. 299,586 | 1/1989 | Lanius | D3/38 |
| D. 306,096 | 2/1990 | Dickinson et al. | D3/72 |
| D. 328,188 | 7/1992 | Jacobsen et al. | D3/76 |
| D. 353,048 | 12/1994 | VanSkiver et al. | D3/276 |
| D. 378,164 | 2/1997 | Lee | D3/276 |
| 782,047 | 2/1905 | Pearson | 190/112 |
| 2,604,961 | 7/1952 | Koch | 190/28 |
| 2,717,093 | 9/1955 | Mautner | 190/28 |
| 2,741,349 | 4/1956 | Peters | 190/28 |
| 2,758,682 | 8/1956 | Shwayder | 190/28 |
| 2,782,889 | 2/1957 | Eber | 190/28 |
| 3,335,827 | 8/1967 | Hofferbert | 190/127 |
| 5,513,066 | 4/1996 | Berman | 361/625 |
| 5,528,453 | 6/1996 | Berman et al. | 361/625 |

FOREIGN PATENT DOCUMENTS 1147916  4/1969  United Kingdom ..................... 190/28

*Primary Examiner*—Jimmy G. Foster
*Attorney, Agent, or Firm*—Lyon & Lyon LLP

[57] ABSTRACT

A musical sound equipment case used for rack-mounting sound equipment has a molded body with top and bottom surfaces raised above the valences. During impact to the top or bottom surface, the entire surface acts as a bumper or shock absorber to spread the load of the impact across the surface, as opposed to in the direction of the impact itself. Thus, the valences are less likely to experience the force of such an impact, and therefore less likely to incur damage.

16 Claims, 3 Drawing Sheets

MUSICAL SOUND EQUIPMENT CASE

FIELD OF THE INVENTION

The present invention relates to musical sound equipment cases, and more particularly to cases for holding rack-mounted sound equipment such as amplifiers, equalizers, effects boxes, samplers, and the like.

BACKGROUND OF THE INVENTION

Rack-mount musical sound equipment cases exist in various styles and sizes to accommodate various shapes and quantities of rack-mountable equipment. The rack-mounting capability refers to the ability to mount various pieces of equipment in the case in such a manner that the face plates of the various pieces appear to be stacked upon one another as if each was resting on an individual rack. Rack-mounting is well known in the art.

Some cases have a front panel removable from the body, to expose the equipment controls for easy access. Some cases have a back panel removable from the body, to expose the jacks or connectors on the various pieces of equipment so the equipment may be electrically connected to musical instruments, speakers, other rack-mounted equipment, and power supplies.

It is common for the cases to have metal valences separating the panels from the body, and which are used in conjunction with latches to allow attachment and removal of the panels from the body in a conventional manner. The valances also help provide a barrier to dust and other foreign particles when the case is closed.

Since musical sound equipment cases get banged around quite often, the valences are often damaged to a point beyond repair. This may occur when the cases are in transit on the road or especially at airports during baggage handling. Even when not in transit, since the cases are designed to hold rack-mounted sound equipment, they are often stacked upon one another to accommodate a larger quantity of equipment. This alone causes a significant amount of stress to substantially the entire top and bottom surfaces of the body of the cases. Furthermore, during routine use the cases usually get banged around by party-goers, technicians, musicians, and others.

Bumpers along the outer edge of the valences have been used to help prevent damage to the valences in certain situations, but such bumpers are ineffective when the impact to the cases is on substantially the entire top or bottom surface of the body. Despite the bumpers, the valences tend to bend due to the stress of the impact.

SUMMARY OF THE INVENTION

An object of this invention is to provide a musical sound equipment case which provides protection to the valences in situations where the case experiences impact on substantially the entire top or bottom surface of the body.

This is accomplished in the preferred embodiment of the present invention by a musical sound equipment case with a molded body having top and bottom surfaces raised above the valences. During impact to the top or bottom surface, the entire surface acts as a bumper or shock absorber to spread the load of the impact across the surface, as opposed to in the direction of the impact itself. Thus, the valences are less likely to experience the force of such an impact, and therefore less likely to incur damage.

Other objects of the invention will become apparent from the detailed description of the preferred embodiment which follows, when read in conjunction with the drawings.

DETAILED DESCRIPTION OF THE PREFERRED EMBODIMENT

The drawings illustrate the preferred embodiment of the invention: a musical sound equipment case with a molded body having top and bottom surfaces raised above the valences. The drawings show the case with a specific shape and style, but persons of ordinary skill in the art will recognize that the case may take various shapes and styles without affecting the inventive concepts herein.

Figure 1:
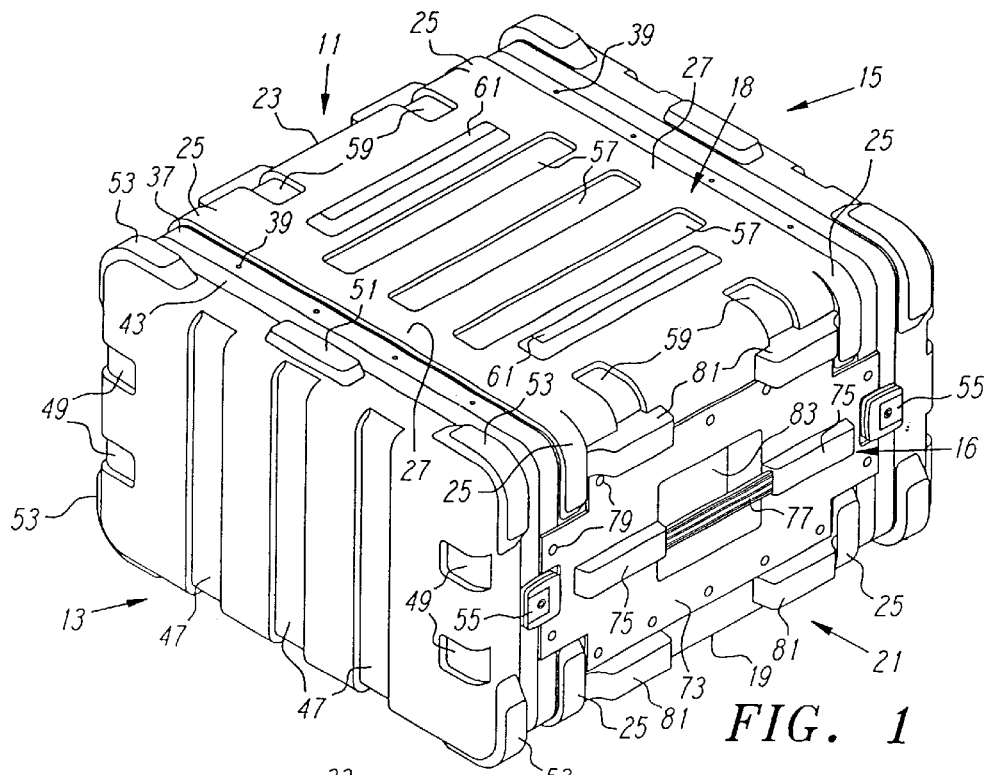
FIG. 1 is a perspective view showing the top, front, and right side of the musical sound equipment case.
Figure 2:
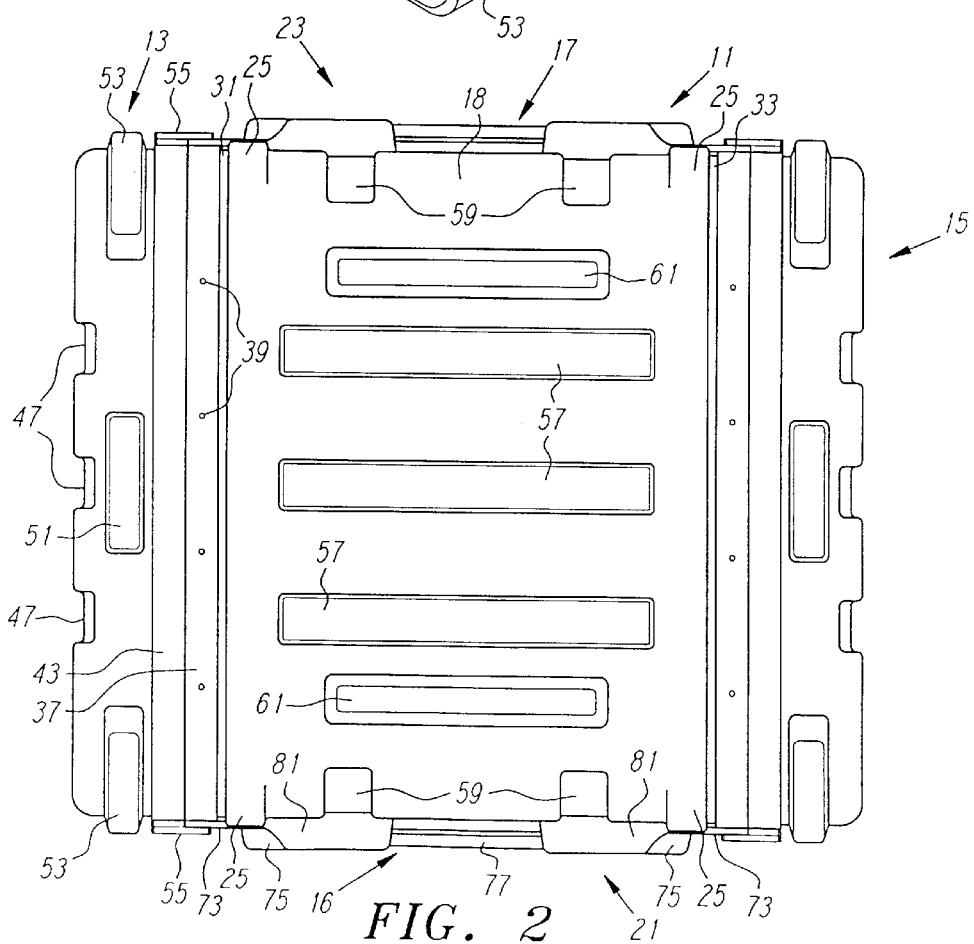
FIG. 2 is a plan view of the top of the case.
Figure 3:
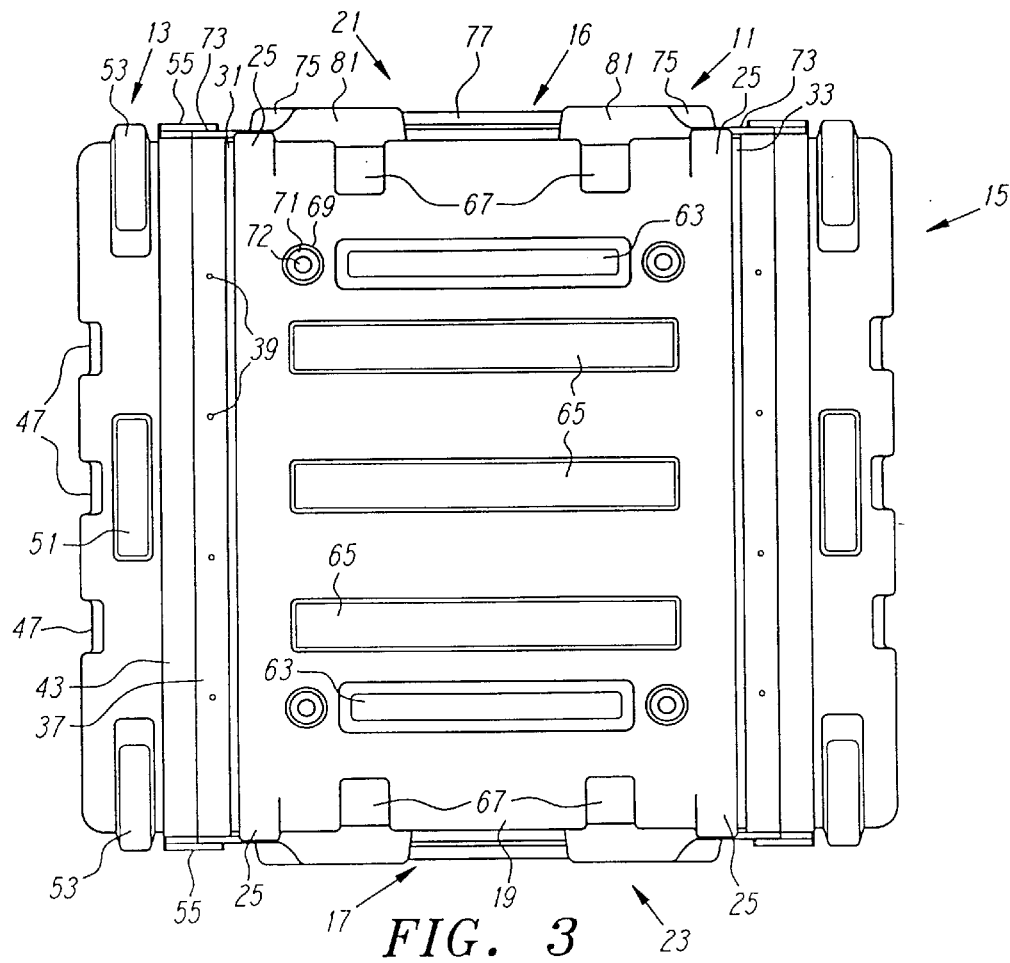
FIG. 3 is plan view of the bottom of the case.

FIG. 1 shows the musical sound equipment case which has a body 11, a front panel 13, a back panel 15, a right side handle assembly 16, and a left side handle assembly 17 (FIG. 2 and FIG. 3). The body 11 is preferably molded from plastic in a single piece. The front panel 13 is also preferably molded from plastic in a single piece, and from the same mold as the back panel 15. The body 11 has a top 18 as best seen in FIG. 2, a bottom 19 as best seen in FIG. 3, a substantially open right side 21, and a substantially open left side 23. The open right and left sides 21 and 23 are covered by identical right and left side handle assemblies 16 and 17 respectively. The body 11 also has an open front and an open back which may be covered by the panels 13 and 15 respectively.

Since the panels 13 and 15 are preferably molded from the same mold, labeling a panel as the front panel 13 or the back panel 15 is arbitrary, but necessary to maintain a consistent spacial orientation of the panels in relation to the top 18 and bottom 19 throughout the drawings and detailed description. Similarly, the sides 21 and 23 are preferably identical, and the handle assemblies 16 and 17 are preferably identical, so labeling a side or handle assembly as the right side 21 or the left side 23, or the right side handle assembly 16 or the left side handle assembly 17, is also arbitrary, but again necessary to maintain a consistent spacial orientation of the sides and handle assemblies in relation to the top 18 and bottom 19 throughout the drawings and detailed description.

Due to the symmetry of the front and back panels 13 and 15, the right side and left side handle assemblies 16 and 17, and the right and left sides 21 and 23, subsequent descriptions of the panels 13 and 15, handle assemblies 16 and 17, and sides 21 and 23, will focus on the front panel 13, the right side handle assembly 16, and the right side 21. However, such descriptions accurately describe the corresponding back panel 15, left side handle assembly 17, and left side 23 respectively.

The body 11 is substantially box-shaped with an open front, open back, substantially open right side 21, and substantially open left side 23. The eight corners of the body 11 are rounded as a decorative feature, as well as to prevent injury to persons or things that contact the corners. The rounded corners are molded to form valence guards 25, as will be described more fully in conjunction with the description of the raised surfaces 27 and 29 of the top 18 and bottom 19 respectively.

The body 11 has a first outwardly extending lip 31 (FIG. 2, FIG. 3, and FIG. 6) which traverses the periphery of the body 11 at the open front, and a second outwardly extending lip 33 (FIG. 2 and FIG. 3) which traverses the periphery of the body 11 at the open back. The front panel 13 has an inwardly extending lip 35 (FIG. 6) which traverses the inner periphery of the panel 13.

Figure 6:
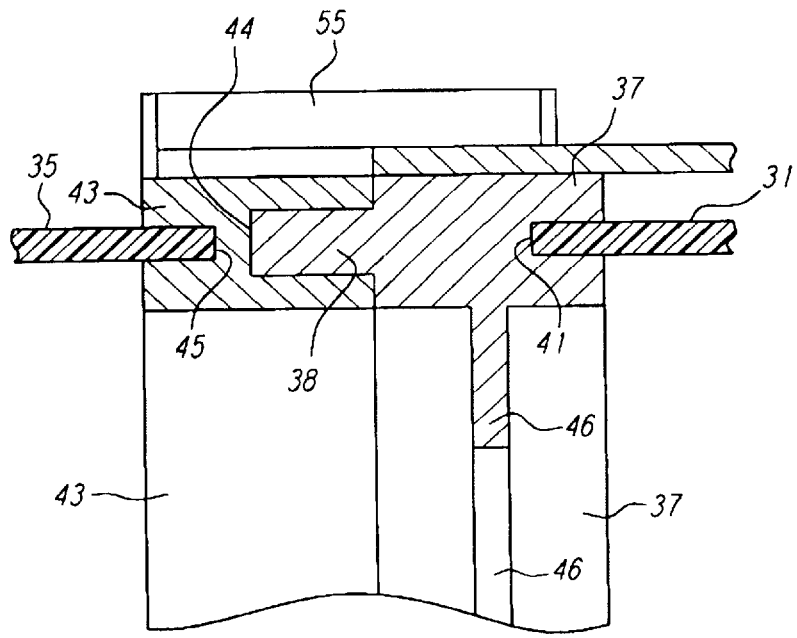
FIG. 6 is an enlarged cross section along line 6—6 of FIG. 4, showing male and female portions of the valences.

A male valence 37, preferably metal, circumscribes the entire first lip 31 at the open front of the body 11, and is attached thereto by metal rivets 39. The male valence 37 has a groove 41 adapted to fit over the first lip 31 of the body 11, and a male portion 38 to mate with the female valence 43, as best seen in FIG. 6. The female valence 43, also preferably metal, circumscribes the entire lip 35 of the front panel 13, and is attached thereto by metal rivets (not shown). The female valence 43 has a groove 45 adapted to fit over the lip 35 of the front panel 13, and a female portion 44 to mate with the male valence 37, as best seen in FIG. 6. The male valence 37 also has an inwardly extending T-bar portion 46 (FIG. 6) suitable to work in conjunction with metal clips (not shown) which are standard in the industry, to mount rack-mountable sound equipment. The preferred embodiment of the present invention accommodates industry-standard nineteen inch rack-mountable sound equipment.

The front panel 13 has a plurality of strengthening ribs 47 as best seen in FIG. 1, which may act as shock absorbers if the panel 13 is impacted from the outside. The ribs 47 are molded into the panel 13 and are preferably evenly spaced apart and parallel to each other, and when the front panel 13 is attached to the body 11, the ribs 47 extend vertically from near the bottom 19 of the case to near the top 18 of the case. There are also a plurality of indentations 49 molded into the right and left sides of the front panel 13, which extend from near the female valence 43 inwardly toward the strengthening ribs 47. The indentations 49 on each side of the panel 13 are preferably evenly spaced apart and parallel to each other, and substantially perpendicular to the strengthening ribs 47. The indentations 49 are decorative, but may act as shock absorbers if the panel 13 is impacted from the outside. There are also bumpers 51 molded into the top and bottom of the front panel 13, which are substantially parallel to the valences 37 and 43 and serve to protect the valences 37 and 43 from external impacts. Similarly, corner bumpers 53 are molded into each of the corners of the front panel 13, and wrap around the corners, paralleling the path of the valences 37 and 43 and providing protection thereto.

The female valence 43 of the front panel 13 is adapted to engage the male valence 37 at the open front of the body 11, such that the front panel 13 fits snugly over the open front of the body 11. The front panel 13 also contains metal latches 55 fixed at suitable positions such that the panel 13 can be fastened to the body 11 at the open front of the body 11 in a conventional manner by engaging corresponding latch locks (not shown) fixed to the male valence 37.

Turning to FIG. 1 and FIG. 2, the top 18 has strengthening ribs 57 and indentations 59 at positions analogous to the strengthening ribs 47 and indentations 49 on the front panel 13, and serving substantially the same purposes as the strengthening ribs 47 and indentations 49 respectively on the front panel 13. In addition, there are two male stacking ridges 61 molded into the top 18, which correspond to complementary female stacking ridges 63 (FIG. 3) molded into the bottom 19, such that the male stacking ridges 61 at the top of a first case may engage the female stacking ridges 63 at the bottom of a second case, when the second case is stacked on top of the first case. This allows for the capability of relatively secure stacking of cases. Case stacking is common in the industry both for storing the cases when they are empty or housing inactive sound equipment, and for providing more rack mounting space for active sound equipment.

The most important feature of the top 18, which is one of the primary inventive concepts herein, is the raised surface 27 as best seen in FIG. 1. The valence guards 25 at the corners of the top 18, curve from the sides 21 and 23 up onto the top 18 and ultimately blend into the raised surface 27 of the top 18. The main surface 27 of the top 18 is raised slightly above the valences 37 and 43, though not as high as the male stacking ridges 61 or the front panel bumpers 51 and 53. Since the surface 27 is raised above the valences 37 and 43, during an impact to the top 18 substantially the entire surface 27 acts as a bumper or shock absorber to spread the load of the impact across the surface 27 and lessen the impact to the valences 37 and 43. Thus the valences 37 and 43 are less likely to experience the force of such an impact, and therefore less likely to bend and incur damage.

Turning now to FIG. 3, the bottom 19 is molded substantially the same as the top 18, with two exceptions to be discussed shortly. Thus there are strengthening ribs 65 and indentations 67 at substantially analogous positions to the strengthening ribs 57 and indentations 59 on the top 18, and serving the same purposes as the strengthening ribs 57 and indentations 59 respectively on the top 18. The first difference between the bottom 19 and the top 18, as mentioned earlier, is that the bottom 19 has female stacking ridges 63, unlike the top 18 which has male stacking ridges 61. The second difference is that the bottom 19 also has circular recesses 69 molded into it near the terminal ends of the female stacking ridges 63. Rubber feet 71 are secured in the recesses 69 by rivets 72 or any other conventional means, and serve as a cushion between the raised top surface 27 of a first case and the raised bottom surface 29 of a second case when the second case is stacked on top of the first case.

Figure 5:
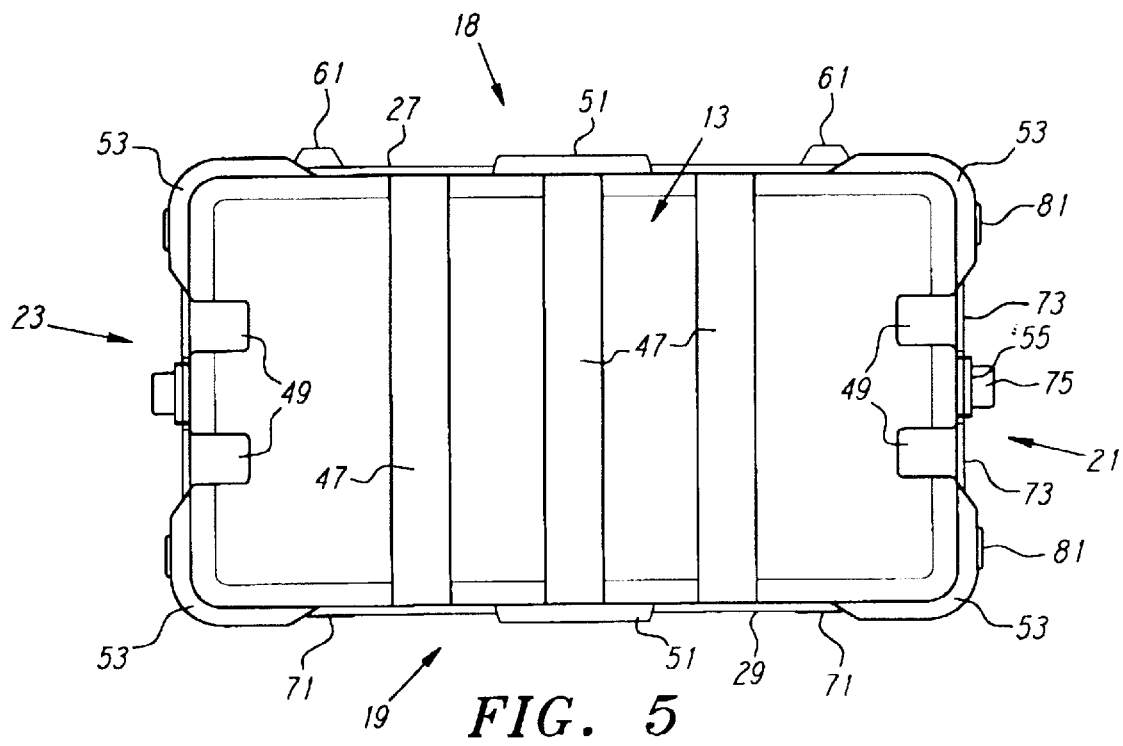
FIG. 5 is a plan view of the front panel of the case.

As with the top 18, the bottom 19 has a raised surface 29, and the valence guards 25 at the corners of the bottom 19 curve from the sides 21 and 23 down onto the bottom 19 and ultimately blend into the raised surface 29 of the bottom 19. And as with the top 18, the main surface 29 of the bottom 19 is raised slightly above the valences 37 and 43. Similar to the top 18, since the surface 29 is raised above the valences 37 and 43, during an impact to the bottom 19 substantially the entire surface 29 acts as a bumper or shock absorber to spread the load of the impact across the surface 29 and lessen the impact to the valences 37 and 43. Thus the valences 37 and 43 are less likely to experience the force of such an impact, and therefore less likely to bend and incur damage. The raised surface 27 of the top 18 is best seen in FIG. 1 and FIG. 5, and the raised surface 29 of the bottom 19 is best seen in FIG. 5.

Figure 4:
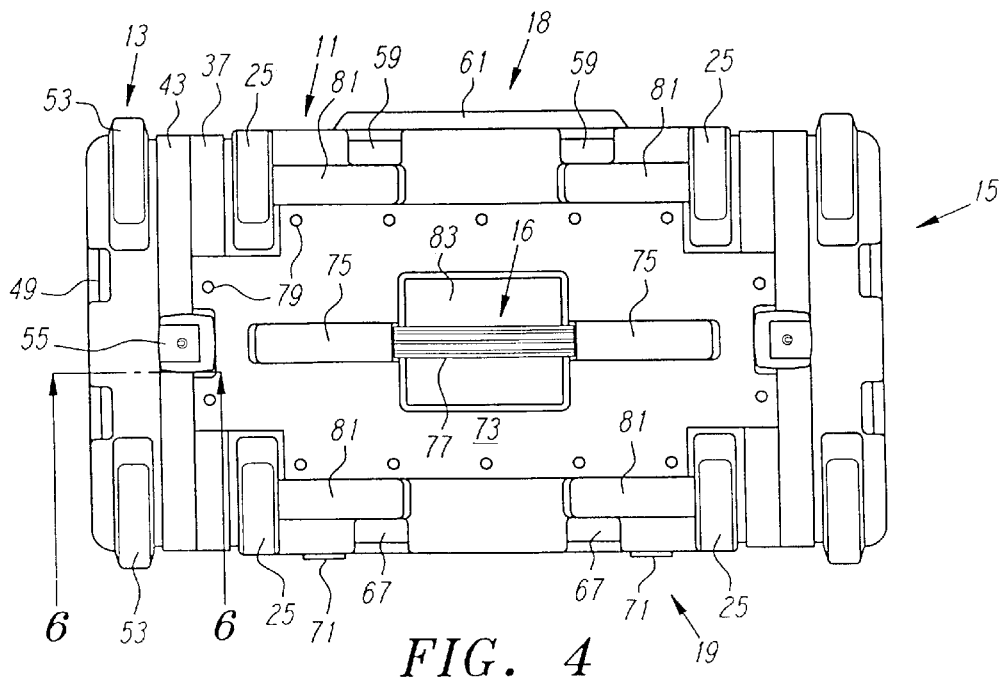
FIG. 4 is a plan view of the right side of the case.

Turning now to FIG. 1 and FIG. 4, the valence guards 25 at the corners of the body curve from the top 18 and bottom 19 onto the right side 21 of the body 11 and terminate where the right side 21 becomes open. The right side 21 is covered by the right side handle assembly 16 which comprises a face plate 73, a face plate backing (not shown), handle holders 75, and a handle 77. The face plate 73 is molded from plastic and is secured to the right side 21 of the body 11 by screws 79 or any other conventional means. The screws 79 go through the face plate 73, then the body 11, and into the face plate backing (not shown) which is also made of plastic. The face plate backing is primarily used for securing the face plate 73 to the body 11 to cover the otherwise substantially open right side 21. The face plate 73 is cut to fit around the valence guards 25 and latches 55, and extends towards the top 18 and bottom 19 of the body 11 where it then terminates substantially flush against side feet 81. The side feet 81 are molded into the body 11 where the top 18 and bottom 19 meet the right side 21, and serve as a base for the case should one desire to rest the case on its side. The side feet 81 therefore must extend out farther than the handle assembly 16. The handle 77 is preferably metal, and is secured in place on each end by the handle holders 75 which are molded into the face plate 73. To ensure a comfortable and secure grip, the handle 77 contains grooves on its flat upper surface, and is curved on its lower surface such that the general shape of the handle 77 is that of a vertical cross-section of a cylinder. The handle 77 spans over a handle well 83 such that one's hand may grip the handle 77 and have one's knuckles rotate freely in the handle well 83 without rubbing against the face plate 73.

While the preferred embodiment is illustrated in the drawings and has just been described herein, it will be apparent to those skilled in the art that modifications can be made to the preferred embodiment without departing from the inventive concepts described. Accordingly, the invention is not to be restricted except by the claims which follow.

What is claimed is:

1. A musical sound equipment case comprising:
    a body with a top a right side, a bottom, and a left side, all molded as a single piece and connected such that the body has an open front, an open back, and a cavity therebetween,
    said body having a first outwardly extending lip stretching across the top of the open front, down the right side of the open front, across the bottom of the open front, and up the left side of the open front, such that the first lip traverses along substantially the entire periphery of the open front,
    said body further having a second outwardly extending lip stretching across the top of the open back, down the right side of the open back, across the bottom of the open back, and up the left side of the open back, such that the second lip traverses along substantially the entire periphery of the open back,
    said top having an outer surface raised above the portions of the first and second lips that stretch across the top of the open front and open back respectively,
    said bottom having an outer surface raised above the portions of the first and second lips that stretch across the bottom of the open front and open back respectively,
    said right side of the body and said left side of the body having openings cut out for receiving handle assemblies.

2. The musical sound equipment case as in claim 1 wherein the right side and the left side of the body each have handle assemblies fixedly attached thereto and covering the openings in the right and left sides respectively.

3. A musical sound equipment case comprising:
    a body with a top, a right side, a bottom, and a left side, all molded as a single piece and connected such that the body has an open front, an open back, and a cavity therebetween;
    a front panel removably attached to the body at the open front of the body, said front panel having a lip that extends inwardly toward the cavity, and circumscribes the inner periphery of the front panel;
    a back panel removably attached to the body at the open back of the body, said back panel having a lip that extends inwardly toward the cavity, and circumscribes the inner periphery of the back panel;
    said body having a first outwardly extending lip stretching across the top of the open front, down the right side of the open front, across the bottom of the open front, and up the left side of the open front, such that the first lip traverses along substantially the entire periphery of the open front;
    said body further having a second outwardly extending lip stretching across the top of the open back, down the right side of the open back, across the bottom of the open back, and up the left side of the open back, such that the second lip traverses along substantially the entire periphery of the open back;
    said top having an outer surface raised above the portions of the first and second lips that stretch across the top of the open front and open back respectively;
    said bottom having an outer surface raised above the portions of the first and second lips that stretch across the bottom of the open front and open back respectively;
    the musical sound equipment case further comprising a first valence circumscribing the lip at the open front of the body, a second valence circumscribing the lip at the open back of the body, a third valence circumscribing the lip of the front panel, and a fourth valence circumscribing the lip of the back panel, said first and third valences uniting to rest substantially flush against one another when the front panel is attached to the open front of the body, said second and fourth valences uniting to rest substantially flush against one another when the back panel is attached to the open back of the body; and
    said raised outer surface of the top extending farther outwardly than the portions of the four valences along the top of the case, and said raised outer surface of the bottom extending farther outwardly than the portions of the four valences along the bottom of the case.

4. The musical sound equipment case as in claim 3 wherein at least one of the first and second valences is adapted to receive rack-mountable musical sound equipment.

5. The musical sound equipment case as in claim 4 wherein the top of the body has a plurality of male stacking ridges, and wherein the bottom of the body has a plurality of corresponding female stacking ridges, such that when a second case is stacked on top of a first case, the male stacking ridges on the top of the first case fit snugly into the female stacking ridges on the bottom of the second case.

6. A musical sound equipment case comprising:
    a body molded as a single piece having a top, a right side, a bottom, a left side, an open front, and an open back, and a cavity therebetween,
    said body further comprising a first outwardly extending lip traversing substantially the entire periphery of the open front, and a second outwardly extending lip traversing substantially the entire periphery of the open back,
    a front panel removably attached to the body at the open front of the body, said front panel having a lip that extends inwardly toward the cavity, and circumscribes the inner periphery of the front panel,
    a back panel removably attached to the body at the open back of the body, said back panel having a lip that extends inwardly toward the cavity, and circumscribes the inner periphery of the back panel,
    a first valence circumscribing the lip at the open front of the body,
    a second valence circumscribing the lip at the open back of the body, a third valence circumscribing the lip of the front panel, a fourth valence circumscribing the lip of the back panel, said top having an outer surface raised above the portions of the four valences along the top of the case, and said bottom having an outer surface raised above the portions of the four valences along the bottom of the case.

7. The musical sound equipment case as in claim 6 wherein the right side and left side of the body have openings cut out for receiving handle assemblies.

8. The musical sound equipment case as in claim 7 wherein the right side and the left side of the body each have handle assemblies fixedly attached thereto and covering the openings in the right and left sides respectively.

9. The musical sound equipment case as in claim 6 wherein the first and third valences unite to rest substantially flush against one another when the front panel is attached to the open front of the body, and wherein the second and fourth valences unite to rest substantially flush against one another when the back panel is attached to the open back of the body.

10. The musical sound equipment case as in claim 6 wherein the raised outer surface of the top extends farther outwardly than do the portions of the four valences along the top of the case, and wherein the raised outer surface of the bottom extends farther outwardly than do the portions of the four valences along the bottom of the case.

11. The musical sound equipment case as in claim 6 wherein at least one of the first and second valences is adapted to receive rack-mountable musical sound equipment.

12. The musical sound equipment case as in claim 6 wherein the top of the body has a plurality of male stacking ridges, and wherein the bottom of the body has a plurality of corresponding female stacking ridges, such that when a second case is stacked on top of a first case, the male stacking ridges on the top of the first case fit snugly into the female stacking ridges on the bottom of the second case.

13. A musical sound equipment case comprising:

a body molded as a single piece having a top, a bottom, a substantially open right side, a substantially open left side, an open front, and an open back, said body further comprising a first outwardly extending lip traversing substantially the entire periphery of the open front, and a second outwardly extending lip traversing substantially the entire periphery of the open back, said top having an outer surface raised above the portions of the first and second lips along the top of the case, and said bottom having an outer surface raised above the portions of the first and second lips along the bottom of the case.

14. The musical sound equipment case as in claim 13 further comprising a front panel removably attached to the body at the open front of the body, a back panel removably attached to the body at the open back of the body, a right side handle assembly secured into the substantially open right side of the body, and a left side handle assembly secured into the substantially open left side of the body, the handle assemblies covering the openings in the right and left sides of the body respectively.

15. The musical sound equipment case as in claim 14 further comprising a first valence circumscribing the lip at the open front of the body, a second valence circumscribing the lip at the open back of the body, a third valence circumscribing the inner periphery of the front panel, a fourth valence circumscribing the inner periphery of the back panel, and wherein the outer surface of the top is raised above the portions of the four valences along the top of the case, and wherein the outer surface of the bottom is raised above the portions of the four valences along the bottom of the case.

16. The musical sound equipment case as in claim 13 further comprising a first valence circumscribing the lip at the open front of the body, and a second valence circumscribing the lip at the open back of the body, and wherein the outer surface of the top is raised above the portions of the first and second valences along the top of the case, and wherein the outer surface of the bottom is raised above the portions of the first and second valences along the bottom of the case.

\* \* \* \* \*